United States Patent
McClelland

(10) Patent No.: US 6,226,895 B1
(45) Date of Patent: *May 8, 2001

(54) FOOTWEAR CONSTRUCTION

(75) Inventor: Larry W. McClelland, Rockford, MI (US)

(73) Assignee: Wolverine World Wide, Inc., Rockford, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,825

(22) Filed: Jun. 25, 1998

(51) Int. Cl.[7] ............................ A43B 13/18; A43B 13/00; A43C 13/00; A43D 11/00; A43D 9/00
(52) U.S. Cl. ...................... 36/17 R; 36/22 R; 36/30 A; 36/71.5; 36/14; 12/142 D; 12/142 T
(58) Field of Search ...................... 36/17 R, 18, 22 R, 36/30 A, 71.5, 12, 4, 14; 12/148, 142 D, 142 T, 142 RS, 142 C

(56) References Cited

U.S. PATENT DOCUMENTS

| | | |
|---|---|---|
| D. 083,027 | 1/1931 | Arnold . |
| D. 141,974 | 8/1945 | Wright . |
| D. 377,561 | 1/1997 | McClelland . |
| 648,209 | 4/1900 | Jackson . |
| 712,437 * | 10/1902 | Schermerhorn ................ 36/17 R |
| 1,111,437 * | 9/1914 | Butterfield ..................... 36/17 R |
| 1,944,805 | 1/1934 | Osborne . |
| 2,034,650 | 3/1936 | Brown . |
| 2,071,065 | 2/1937 | Everett et al. . |
| 2,201,382 | 5/1940 | Vizard . |
| 2,289,335 * | 7/1942 | Ayers ........................... 12/142 D |
| 2,359,681 * | 10/1944 | Rovick ......................... 36/17 R |
| 2,438,095 | 3/1948 | Phinney . |
| 2,753,636 | 7/1956 | Withington, Jr. . |
| 2,754,600 | 7/1956 | Vizard . |
| 2,922,236 | 1/1960 | Rubico . |
| 3,046,679 * | 7/1962 | Maertens et al. ............... 36/17 R |
| 3,046,680 * | 7/1962 | Hill et al. ...................... 36/17 R |
| 3,098,308 * | 7/1963 | Liebscher et al. . |
| 3,170,253 | 2/1965 | Johnson . |
| 3,190,016 * | 6/1965 | Hansjosten . |
| 3,216,033 * | 11/1965 | Nadler . |
| 3,308,560 | 3/1967 | Jones . |
| 3,416,174 * | 12/1968 | Novitske . |
| 3,416,244 * | 12/1968 | Radcliffe et al. ............... 12/148 |
| 4,651,443 | 3/1987 | Eckstrom . |
| 4,663,865 * | 5/1987 | Telecemian .................... 36/114 |
| 4,685,223 * | 8/1987 | Long ............................. 36/12 |
| 5,768,801 * | 6/1998 | Huff ............................. 36/17 R |
| 5,784,736 * | 7/1998 | Issler et al. ................... 12/142 B |
| 5,890,248 * | 4/1999 | Gee . |
| 5,992,054 * | 11/1999 | Rauch . |

FOREIGN PATENT DOCUMENTS

| | | |
|---|---|---|
| 175191 | 11/1952 | (AT) . |
| 0018663 * | 5/1980 | (EP) ........................... 36/30 A |
| 984657 | 7/1951 | (FR) . |

* cited by examiner

Primary Examiner—Paul T. Sewell
Assistant Examiner—Anthony Stashick
(74) Attorney, Agent, or Firm—Warner Norcross & Judd

(57) ABSTRACT

A shoe construction having a sole with an outsole shell that is filled with a filling material, such as polyurethane foam, and secured to the upper by a welt. The sole includes an insole having a downwardly extending rib, an outer shell defining a void containing the filling material, and a welt that interconnects the outsole shell and the insole with the upper. To assemble the construction, the upper is lasted and either stitched or stapled to the insole. The welt is then stitched or stapled to the insole/upper combination. Next, the filling material is poured into the void in the outsole shell and the shell is directly attached by the filling material to the upper/insole/welt assembly. The outsole welt is stitched to the shell around the entire periphery of the sole. The stitch extends between a stitch groove in the welt and a stitch groove in the outsole shell.

15 Claims, 4 Drawing Sheets

FOOTWEAR CONSTRUCTION

BACKGROUND OF THE INVENTION

The present invention relates to footwear construction, and more particularly to a footwear construction in which the sole is attached to the upper by a welt.

A variety of different sole constructions are used by the footwear industry. For the most part, each sole construction has characteristics that make it particularly well-suited for specific applications. For example, some sole constructions are selected for their durability, others for their flexibility and comfort, while still others are selected for their aesthetic appeal. One particularly popular type of sole construction is referred to as a welt construction. Welt constructions are popular because they are durable and are aesthetically desirable. There are a variety of different types of welt constructions, but in each construction a "welt," for example, a strip of material such as leather or hard rubber, is used to intersecure the sole and the upper. FIG. 1 is an exploded sectional view of a conventional welt construction. This construction includes a welt 150 that interconnects an upper 158 and a sole 172. The welt 150 includes a base portion 152 with an upwardly extending rib 154 located toward the center of the base portion and a downwardly extending rib 156 located at the inner edge of the base portion 152. The sole 172 includes an insole 160, a midsole 168, and an outsole 170. The insole 172 includes a downwardly extending rib 164 that is used in interconnecting the insole 160, upper 158 and welt 150.

Assembly of this construction involves a number of common steps. First, the elements of the upper 158 are cut from the desired material and fit together (typically by sewing). The fitted upper 158 is then wrapped tightly around a foot-shaped form, or last, and secured to the insole 160 by stapling, stitching, or otherwise fastening it to the insole rib 164. This step gives the upper 158 the desired shape and is commonly referred to as lasting. Once lasted, the welt 150 is stitched or stapled to the upper 158 and insole 160 by stitches or staples that extend through the inner welt rib 156, the bottom periphery of the upper 158, and the insole rib 164. The midsole 168 is stitched, stapled or otherwise secured to the bottom of the upper/insole assembly. Typically, the midsole 168 is attached to the upper/insole assembly by stitching that extends through the base portion 152 of the welt 150 and the midsole 168. Afterwards, the outsole 170 is secured to the bottom of midsole 168, typically by cement or other adhesives. Although this construction is durable and aesthetically appealing, it is a relatively heavy construction and it does not provide the flexibility of other constructions.

In an effort to improve the flexibility and reduce the weight of the sole, a variety of sole constructions have been developed which incorporate polyurethane. For example, some footwear manufacturers currently sell footwear that incorporates a solid polyurethane outsole. Typically, the polyurethane outsole is either directly attached to the upper or it is attached to a midsole that is in turn attached to the upper. Polyurethane is a relatively soft material and it is not as wear-resistant as many other outsole materials, such as leather and rubber. Also, polyurethane has relatively low tear-resistant characteristics. As a result, it does not hold a stitch or staple well, and is consequently not well suited for use in a welted construction.

In an effort to overcome these problems, a number of attempts have been made to enclose the polyurethane in a shell. The shell is relatively wear resistant and it forms the wear surface of the sole. One such construction includes a rubber shell that is filled with polyurethane. The shell is cemented to the upper in a conventional manner. Although this construction provides the improved comfort and weight characteristics of polyurethane, it fails to provide the durability and aesthetic benefits of a welt construction.

SUMMARY OF THE INVENTION

The aforementioned problems are overcome by the present invention wherein a sole construction is provided which includes a polyurethane filled outsole shell that is secured to the upper by a welt. The sole construction includes a generally conventional insole, an outsole shell manufactured from a durable, wear-resistant material, and a welt that interconnects the outsole shell and the insole with the upper. The outsole shell defines a chamber that contains a polyurethane filling material. The polyurethane filling material fills the chamber and bonds directly to the insole, welt, and outsole.

In a preferred embodiment, the welt includes a base portion that is stitched to the shell and a downwardly extending rib that is stitched to both the upper and the insole rib. The shell preferably defines a stitch channel that extends entirely around the circumference of shell to receive the stitches that interconnect the welt and the shell.

In a second aspect, the shell includes a plurality of protrusions, such as scallops, that extending into the polyurethane chamber. The polyurethane surrounds and attaches to the protrusions to enhance the connection between the polyurethane and the shell.

The present invention also provides a method for manufacturing a shoe. First, the upper is lasted and either stitched or stapled to the insole. The welt is then stitched or stapled to the insole/upper combination. Then, polyurethane is poured into the chamber in the shell and the shell is direct attached to the upper/insole/welt assembly. As the polyurethane cures, it expands to fill the space and bond to the shell, the insole, and the welt. The welt is then stitched to the shell around the entire periphery of the sole. The stitch extends between a stitch channel in the welt and a stitch channel in the shell, and preferably does not extend through the polyurethane.

The present invention provides a durable and comfortable sole construction. Because the present invention does not require a midsole, the construction is relatively flexible. The outsole shell provides the sole with excellent wear characteristics. Also, the use of polyurethane makes the outsole lighter and more resilient than a conventional welted construction. In addition, the stitch channel in the shell receives the stitching to protect it from abrasion and wear. The present invention is also easily manufactured using conventional machinery. Further, as the polyurethane cures, it expands into and seals the stitch holes and the seams between the insole, the welt, and the upper. As a result, the present invention allows the possible manufacture of the waterproof welted footwear without the need for a membrane.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
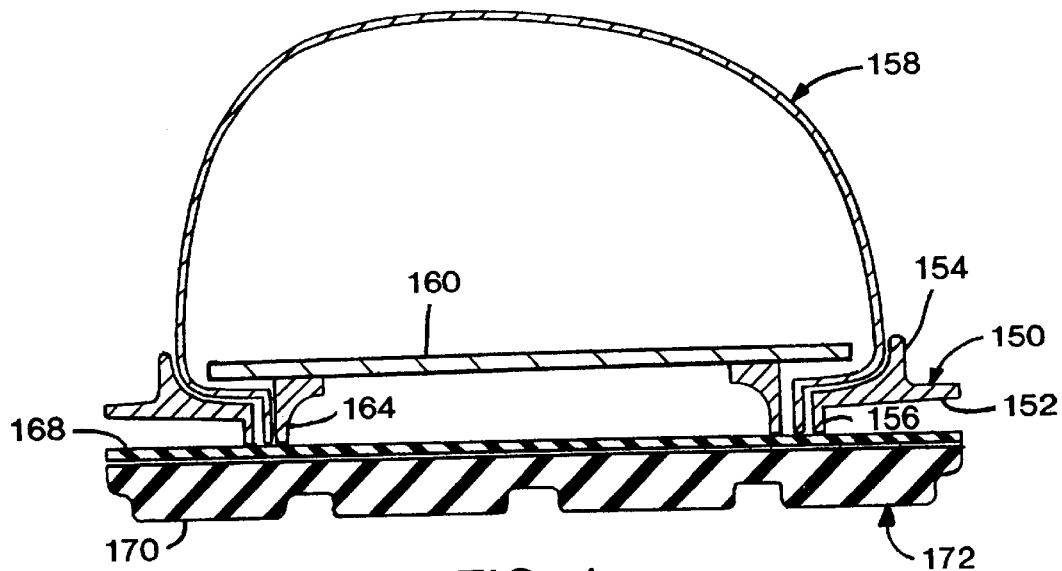
FIG. 1 is a sectional view of a welt sole construction according to the prior art.
Figure 2:
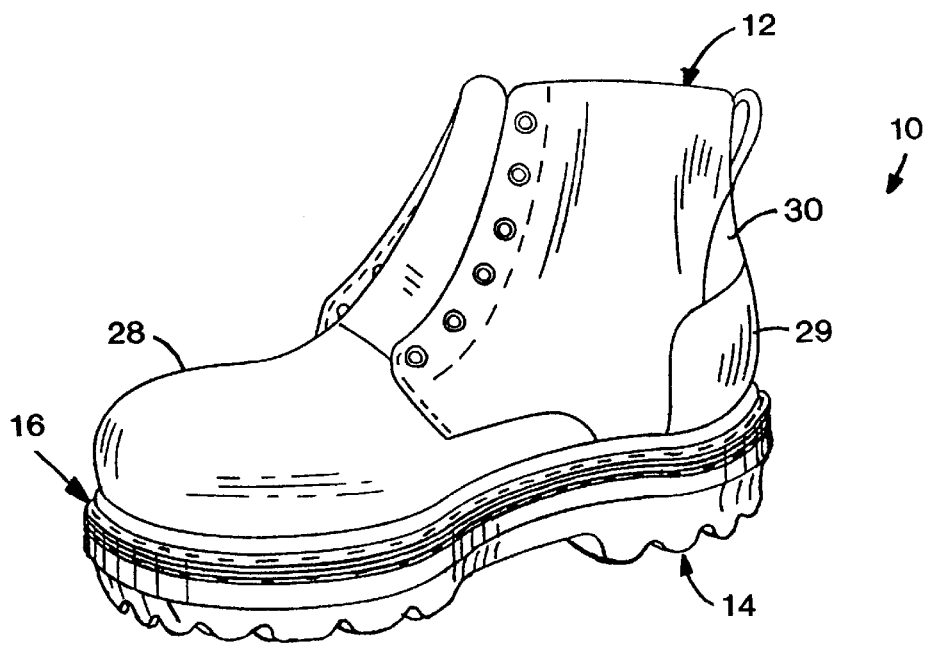
FIG. 2 is a perspective view of an article of footwear incorporating the present invention.
Figure 3:
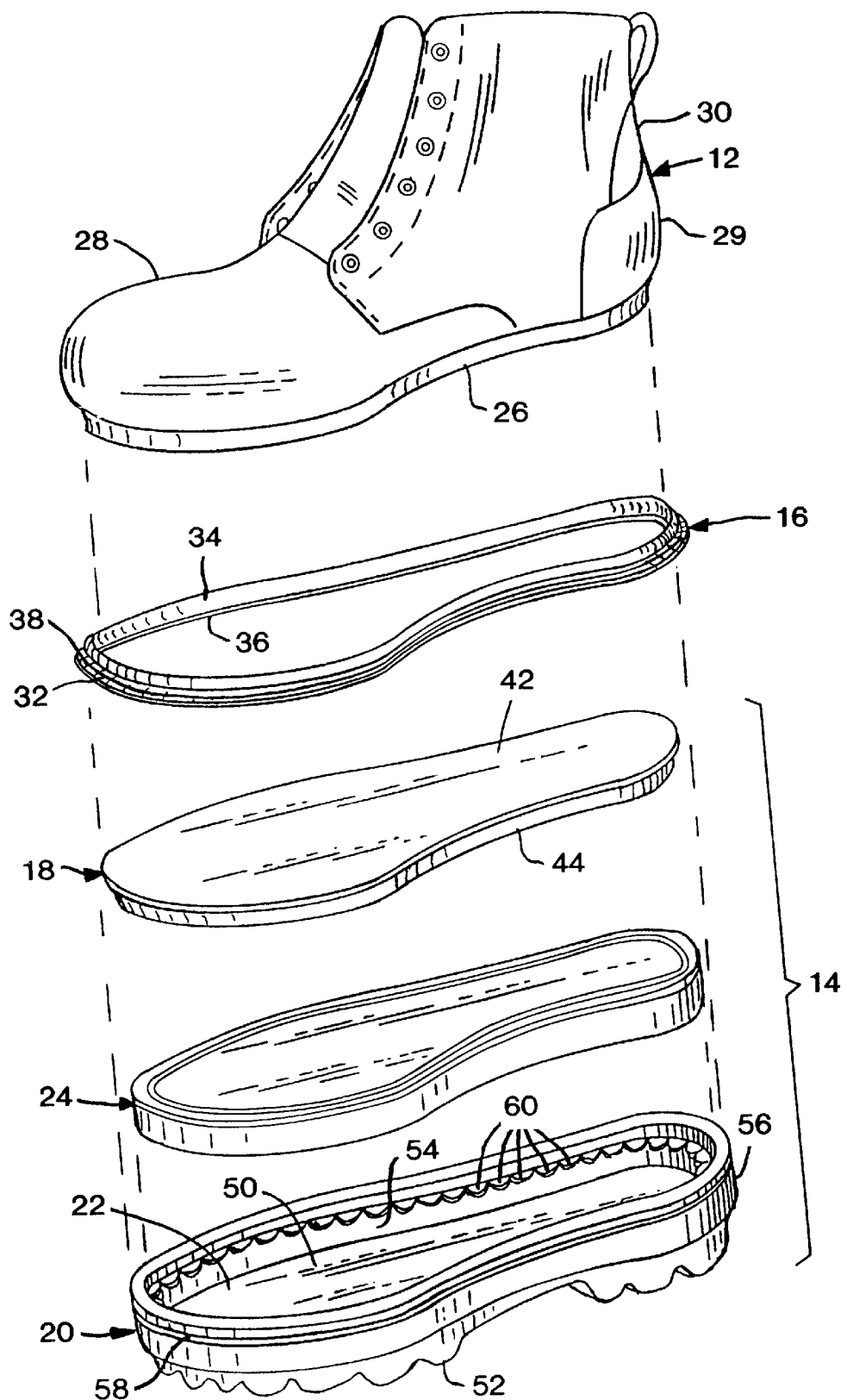
FIG. 3 is an exploded perspective view of the article of footwear.

A boot constructed in accordance with a preferred embodiment of the present invention in shown in FIGS. 2 and 3, and generally designated 10. For purposes of disclosure, the present invention is described in connection with a conventional ¾ height boot. One of ordinary skill in the art will, however, readily appreciate that the present invention is well suited for use with other types of soled footwear. For purposes of this disclosure, the terms inner and outer will be used to denote the directions toward and away from the inside of the boot, respectively.

In general, the boot 10 includes an upper 12 that is secured to the sole 14 by a welt 16. As perhaps best shown in FIG. 3, the sole 14 includes an insole 18 and an outsole shell 20. The outsole shell 20 defines a void 22 that contains a filling material 24, such as polyurethane. The welt 16 is attached to and interconnects the upper 12, insole 18, and shell 20.

The upper 12 is generally conventional and will not be described in detail. Suffice it to say that the upper 12 includes a quarter 29, a vamp 28, and a backstay 30. The upper 12 terminates in a lower peripheral edge 26 that is attached to the sole 14 as described in detail below. The upper 12 is preferably manufactured from leather, canvas, nylon or other suitable materials, and may include a liner (not shown) or other conventional accessories.

The welt 16 extends entirely around the boot 10 to interconnect the upper 12 and the sole 14. As perhaps best shown in FIG. 4, the welt 12 is also generally conventional. The welt 12 includes a generally horizontal base portion 32 with an upwardly extending upper rib 34 located toward the center of the base portion 32 and a downwardly extending lower rib 36 located at the inner edge of the base portion 32. The outer surface of the upper rib 34 is rounded to, among other things, reduce the profile of the welt 16. The lower rib 36 is generally rectangular in cross-section and is of sufficient size to receive staples, stitching or other fastening elements. The horizontal base portion 32 defines an upwardly opening stitch groove 38 that extends around the welt 16 near its outer edge. The stitch groove 38 is adapted to receive the stitching 72 that interconnects the shell 20 and welt 16 as described in more detail below.

As noted above, the sole 14 includes an insole 18, an outsole shell 20, and a filling material 24, such as polyurethane. If desired, the sole 14 may also include a shank (not shown), a filler (not shown) or other conventional sole components. The insole 18 is generally conventional and includes a base 42 and a downwardly extending rib 44. The base 42 is generally planar and corresponds in shape with the outline of a foot. The insole rib 44 extends downwardly from and around the base 42 near its outer edge. The insole rib 44 is of sufficient size to receive staples, stitching or other fastening elements.

The outsole shell 20 is preferably manufactured from a relatively hard rubber or other sufficiently durable and wear-resistant material. The outsole shell 20 generally includes a bottom 46 and a peripheral wall 48 extending upwardly from the periphery of the bottom 46. The bottom 46 includes an inner surface 50 and an outer surface 52. The outer surface 52 forms the wears surface of the sole 14 and is contoured to define the desired heel and tread pattern. The outer surface 52 may also be textured as desired to improve the traction and aesthetic appeal of the boot. The peripheral wall 48 also includes an inner surface 54 and an outer surface 56. The outer surface 56 of the peripheral wall 48 may be contoured or textured to provide the desired visual appearance. The outer surface 56 defines an outwardly opening stitch groove 58. The stitch groove 58 extends around the peripheral wall 48 near its upper edge. The stitch groove 58 is generally rectangular in cross section. However, its shape may vary from application to application. The peripheral wall 48 includes a plurality of scallops 60, or other protrusions, that extend inwardly near the upper edge of the peripheral wall 48. The scallops 60 interlock with the filler 24 improve the interconnection of the various sole components. If desired, the scallops 60 may define apertures (not shown) through which the filler 24 can flow to further improve the interconnection of the sole components. Obviously, the scallops 60 can be replaced by other similar protrusions.

The filling material 24 is preferably a conventional polyurethane foam. The inner surface 50 of the bottom 46 and the inner surface 54 of the peripheral wall 48 cooperatively define a void 22 that receives the filling material 24. As described below, the filling material 24 is preferably pour molded into the void 22 during assembly of the boot 10 such that it expands to flow around and interlock the insole 18, the outsole shell 24, and the welt 16. The density and precise chemical make-up of the polyurethane will vary from application to application depending on a variety of factors, including the size of void 22 and the desired cushioning and flexibility characteristics.

Manufacture and Assembly

The boot 10 is manufactured using generally conventional machinery. The insole 18 is manufactured using conventional techniques and apparatus. The insole base 42 and insole rib 44 are manufactured in a conventional manner. The insole rib 44 is attached to the undersurface of the insole base 42 by cement, adhesives or other conventional methods. Alternatively, the insole 18 can be manufactured with an integral base and rib. The insole 18 is stapled or otherwise secured to the bottom surface of a conventional last (not shown).

The upper 12 is manufactured using generally conventional techniques and apparatus. The desired upper material (not shown) is cut to form the various elements of the upper, including the vamp 28, quarter 29, and backstay 30. The elements of the upper 12 are then fitted and sewn together using conventional methods and apparatus. A lining (not shown) may be sewn within the upper during the fitting step. The fitted upper 12 is stretched over a last (not shown) and stapled to insole 18. The insole rib 44 is stapled directly to the lower peripheral edge 26 of the upper 12 using conventional apparatus and techniques to intersecure the upper 12 and insole 18. Alternatively, insole rib 44 can be sewn to the upper 12 in a conventional manner.

The welt 16 is manufactured using conventional techniques and apparatus. For example, the welt 16 can be extruded from a hard durable rubber. Once the upper 12 is lasted to the insole 18, the welt 16 is attached to the upper 12 and insole 18. First, lower welt rib 36 is stitched around the periphery of the upper 12 and insole 18 using conventional apparatus and techniques. This rib stitch 40 preferably extends entirely through the lower welt rib 36, the lower peripheral edge 26 of the upper 12, and the insole rib 18. If desired a filler (not shown), shank (not shown) or other conventional sole component can be cemented to the bottom surface of the insole 18 using conventional adhesive or cement.

The outsole shell 20 is manufactured using conventional techniques and apparatus. The outsole shell 20 is preferably injection or pour molded from a hard, durable rubber using conventional molding apparatus. The outsole shell 20 can, however, be manufactured from other durable outsole materials. The stitch groove 58, scallops 60, void 22 and desired tread pattern are all formed during the molding operation as an integral part of the outsole shell 20.

Once the outsole shell 20 is manufactured, it is attached to the upper/welt/insole combination using conventional machinery. The machinery preferably includes a conventional die (not shown) that facilitates assembly of the boot 10. The die includes a top half, which receives the upper/welt/insole combination, and a bottom half, which receives the outsole shell 20. The die halves are designed such that they can be closed to hold the upper/welt/insole combination in appropriate alignment with the outsole shell 20. The die holds the bottom surface of the welt 16 directly against the top surface of the peripheral wall 48 firmly enough to prevent the expanding polyurethane from entering the seam during assembly.

After the outsole shell 20 and the upper/welt/insole combination are inserted into the appropriate die halves, the appropriate volume of filler material 24, preferably polyurethane foam, is poured into void 22. As the polyurethane foam is poured into the void 22, it begins to expand and cure. The die is immediately closed bringing the upper/welt/insole combination into proper alignment with the outsole shell 20. The polyurethane foam continues to expand and cure, causing it to surround, entrap, and interlock the various elements, including the insole 18, welt 16, and outsole shell 20. By virtue of its expansion, the polyurethane foam flows into the seams between the welt 16, upper 12, and insole 18 and into the stitch holes in these elements. As a result, the polyurethane filling material 24 allows for the possible manufacture of waterproof welted footwear without the need for a conventional membrane.

Polyurethane foam is generally well-known in the footwear industry, and therefore will not be described in detail. Suffice it to say that polyurethane foam is typically derived by combining a polyether, such as polypropylene glycol, with a diisocyanate in the presence of water and a catalyst. The resulting chemical reaction produces carbon dioxide which causes the polymer to foam. The rigidity and flexibility of the polyurethane foam can be varied from application to application, as desired, using a variety of well-known techniques, such as by adjusting the type and proportionate amount of the reactants. In addition, the rigidity and flexibility of the polyurethane foam can be varied by adjusting the volume of polyurethane foam deposited in the void 22.

Figure 4:
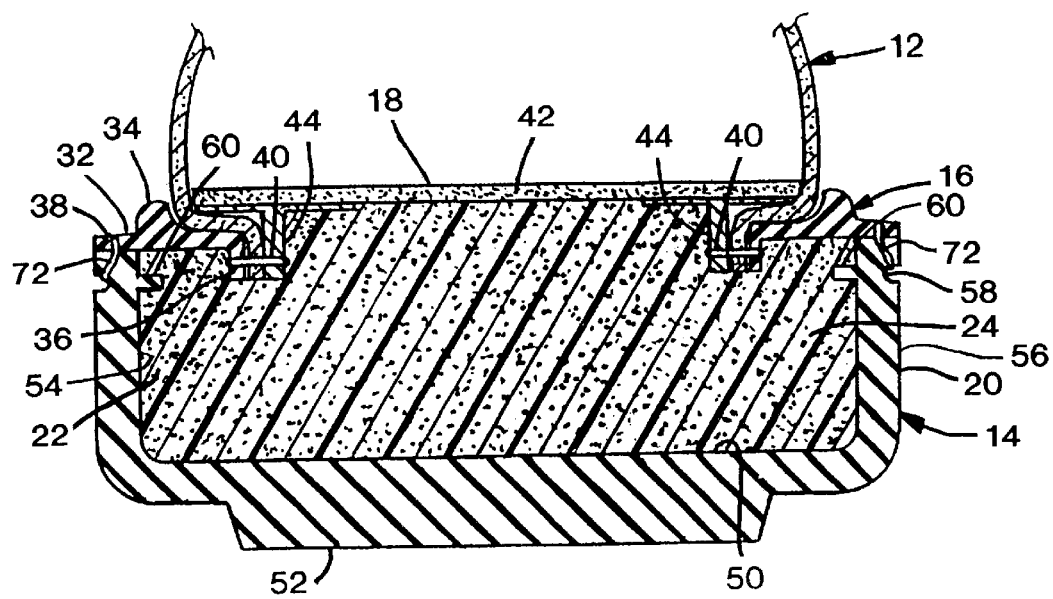
FIG. 4 is a sectional view of an article of footwear incorporating the present invention.
Figure 5:
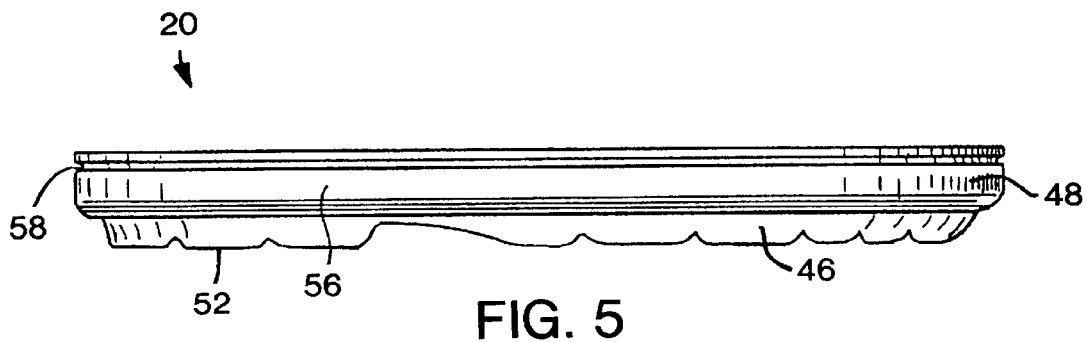
FIG. 5 is a side elevational view of the shell.
Figure 7:
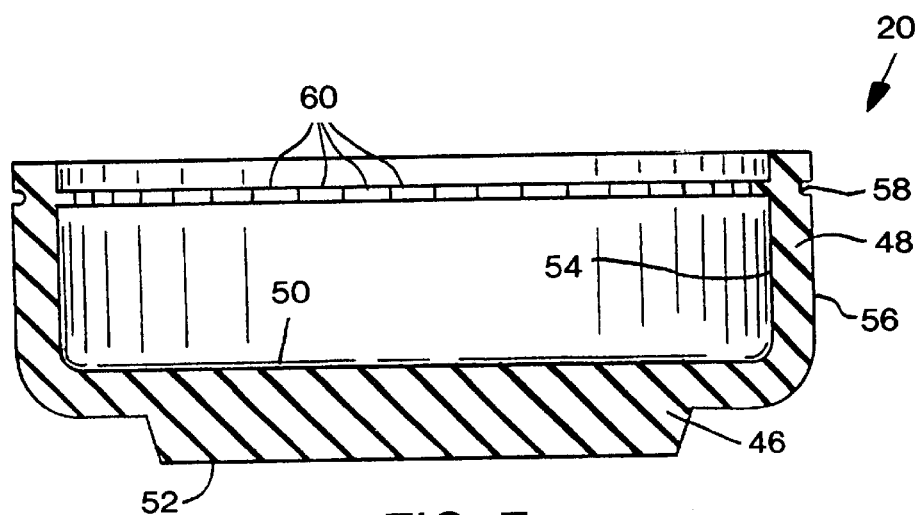
FIG. 7 is sectional view of the shell taken along line VII-VII of FIG. 6.
Figure 6:
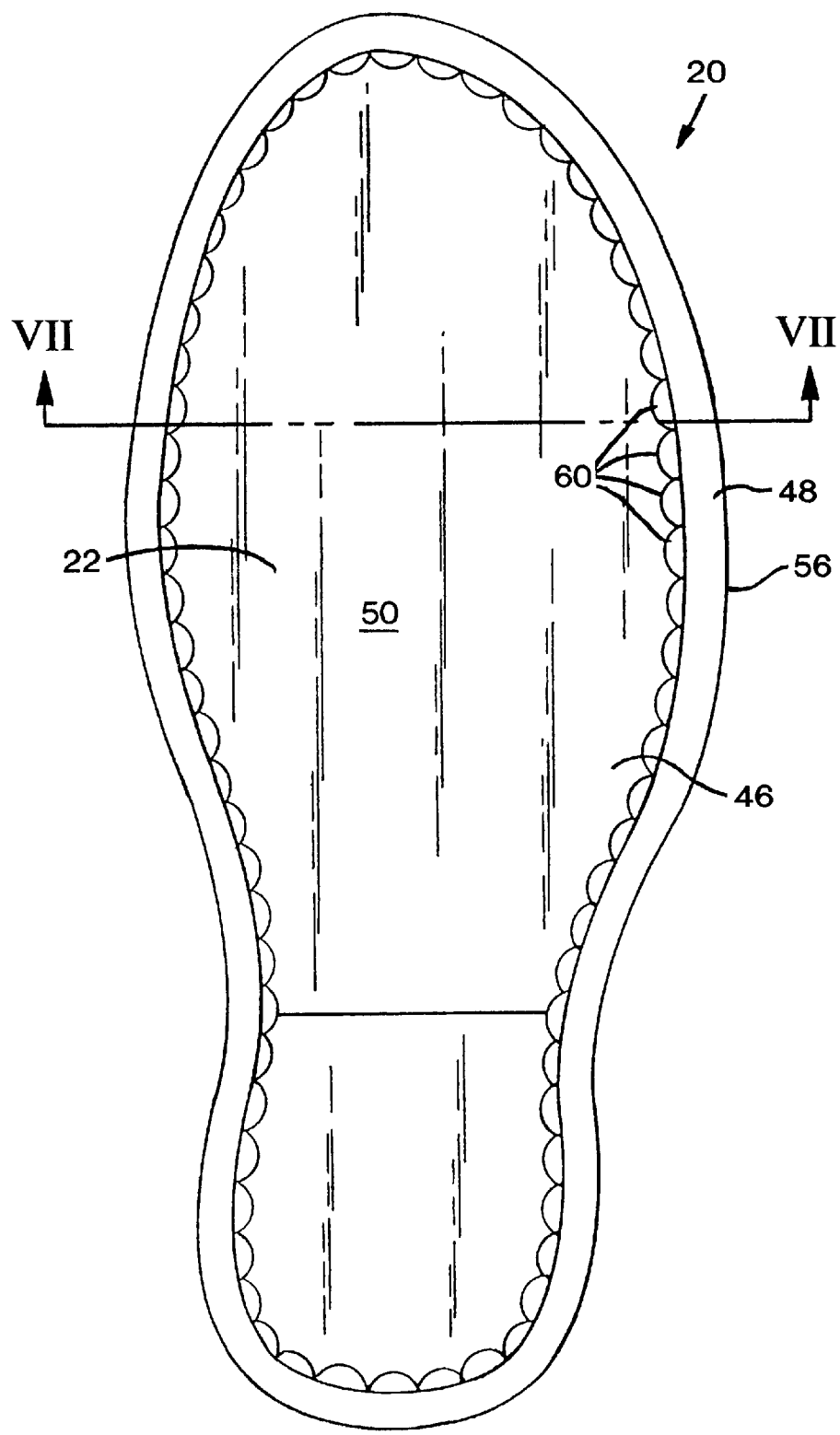
FIG. 6 is a top plan view of the shell.

After the filling material 24 is sufficiently cured, the welt 16 is stitched directly to the outsole shell 20 using conventional machinery. This outsole stitch 72 extends around the periphery of the boot 10 through the welt 16 at stitch groove 38 and the outsole shell 20 at stitch groove 58. The stitches 72 are recessed in the grooves 38 and 58 so that they are protected from abrasion and wear. As shown in FIG. 4, the outsole stitch 72 does not pass through the filling material 24.

Finally, a number of conventional finishing operations are performed on the boot 10. For example, the edge of the sole 14 is trimmed and shaped; the upper 12 is cleaned, polished, and treated as appropriate and necessary; and the laces are inserted in the eyelets.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An article of footwear comprising:
   an upper having a lower peripheral edge:
   a sole having an insole, a polyurethane material and an outsole shell, said polyurethane material direct-attached to said insole and said upper, said outsole shell defining a void filled with said polyurethane material cured in situ within said void, whereby said polyurethane material is bonded directly to said insole and said outsole shell, said polyurethane material forming a majority of said sole with said outsole shell forming only a protective shell about said direct-attached polyurethane material, and
   a welt interconnecting said upper and said sole, said welt secured to said insole and said upper at a first location and to said outsole shell at a second location.

2. The article of claim 1 wherein said welt is secured to said outsole shell by stitching.

3. The article of claim 2 wherein said outsole shell defines a stitch groove and includes an outer surface, said stitching extending through said stitch groove whereby said stitching is recessed below said outer surface.

4. The article of claim 3 wherein said outsole shell includes a bottom and a peripheral wall extending upwardly from said bottom, said peripheral wall directly engaging said welt.

5. The article of claim 4 wherein said filling material is polyurethane.

6. The article of claim 5 wherein said outsole shell includes a plurality of protrusions extending into said void, said protrusions entrapped by said filling material.

7. The article of claim 6 wherein said stitching extends solely through said welt and said outsole shell.

8. A method for constructing an article of footwear comprising:
   constructing an upper having a lower peripheral edge;
   securing an insole to the lower peripheral edge of the upper;
   securing a welt to the insole and the upper to form an upper/welt/insert combination;
   providing an outsole shell having a bottom and a peripheral wall extending upwardly from the bottom, the bottom and peripheral wall cooperatively defining a void;
   placing the outsole shell in a direct attach mold;
   introducing a polyurethane material into the direct attach mold within the outsole shell void, the polyurethane material curing and expanding within the void, the polyurethane material forming the majority of the sole with the outsole shell providing only a protective shell about the polyurethane material;

placing the insole/welt/upper combination over the outsole shell before the polyurethane material has cured such that the polyurethane material expands against and bonds to the insole/welt/upper combination; and securing the welt directly to the outsole shell.

9. The method of claim 8 wherein said step of securing the welt to the outsole shell includes stitching the welt to the outsole shell.

10. The method of claim 9 wherein said step of introducing includes pouring a polyurethane foam into the void.

11. The method of claim 10 wherein the outsole shell defines a stitch groove, said stitching step including stitching a stitch through the stitch groove whereby the stitch is recessed from an outer surface of the outsole shell.

12. The method of claim 11 wherein the outsole shell includes a plurality of protrusions extending into the void, said pouring step including pouring a sufficient volume of polyurethane into the void so that the polyurethane expands around and entraps the protrusions.

13. The method of claim 12 wherein the step of securing the welt to the insole and the upper includes stitching through the welt, the lower peripheral edge of the upper and the insole.

14. The method of claim 13 wherein the welt defines a stitch groove, said stitching step including stitching a stitch through the stitch groove in the welt and the stitch groove in the outsole shell whereby the stitch is recessed from an outer surface of the outsole shell and an outer surface of the welt.

15. The method of claim 14 wherein said providing step includes manufacturing the outsole shell from a durable rubber.

* * * * *